(12) United States Patent
Xiao et al.

(10) Patent No.: US 10,551,231 B2
(45) Date of Patent: Feb. 4, 2020

(54) COMPACT ULTRASONIC FLOWMETER WITH ADJUSTMENT FOR VARIOUS FLOW DIAMETERS

(71) Applicants: Cong Xiao, Shenzhen (CN); Matthew Olin, Monterey, CA (US); Shengshuang Lin, Shenzhen (CN)

(72) Inventors: Cong Xiao, Shenzhen (CN); Matthew Olin, Monterey, CA (US); Shengshuang Lin, Shenzhen (CN)

( * ) Notice: Subject to any disclaimer, the term of this patent is extended or adjusted under 35 U.S.C. 154(b) by 8 days.

(21) Appl. No.: 16/000,761

(22) Filed: Jun. 5, 2018

(65) Prior Publication Data

US 2019/0137310 A1 May 9, 2019

Related U.S. Application Data

(63) Continuation-in-part of application No. PCT/CN2017/087199, filed on Jun. 5, 2017.

(30) Foreign Application Priority Data

Jun. 5, 2017 (CN) .......................... 2017 1 0414529
Jun. 5, 2017 (CN) ...................... 2017 2 0642885 U

(51) Int. Cl.
*G01F 1/66* (2006.01)

(52) U.S. Cl.
CPC .............. *G01F 1/662* (2013.01); *G01F 1/667* (2013.01)

(58) Field of Classification Search
CPC ........................................................ G01F 1/66
See application file for complete search history.

(56) References Cited

U.S. PATENT DOCUMENTS

| 7,201,065 B1* | 4/2007 | Feller | G01F 1/66 |
| | | | 73/597 |
| 7,870,793 B1* | 1/2011 | Feller | G01F 1/667 |
| | | | 73/861.27 |

(Continued)

FOREIGN PATENT DOCUMENTS

| CN | 203848888 U | 9/2014 |
| CN | 104950041 A | 9/2015 |

(Continued)

OTHER PUBLICATIONS

EP, 18176098.4 Extended Search Report, dated Jan. 8, 2019.

*Primary Examiner* — Jewel V Dowtin
(74) *Attorney, Agent, or Firm* — One LLP; Jonathan Jaech

(57) ABSTRACT

An ultrasonic flow meter is disclosed comprising adjustable rotating blocks and a piezoelectric wafer mounted in connection with each rotating block. The piezoelectric wafers or chips are used for transmitting and/or receiving upstream and downstream ultrasonic waves. The rotating blocks adjust the incident angle of the piezoelectric wafers to account for installation in connection with different pipe sizes. By adjusting angle in a linked and continuous manner, no translational sensor movement is required for an optimal ultrasonic wave reflection for the downstream transducer to receive a signal from the upstream transducer and the upstream transducer to receive a signal from the downstream transducer. As such, the devices and methods described enable measurement of liquid flowing in pipes across a range of different diameter pipes so as to greatly increase the convenience and the extent of application or technology adoption.

20 Claims, 5 Drawing Sheets

(56) References Cited

U.S. PATENT DOCUMENTS

| | | | |
|---|---|---|---|
| 8,671,774 B2* | 3/2014 | Murakami | G01F 1/662 73/861.18 |
| 2006/0059999 A1 | 3/2006 | Feller | |
| 2007/0151364 A1 | 7/2007 | Wiest et al. | |
| 2007/0234791 A1 | 10/2007 | Wiest et al. | |
| 2013/0061687 A1 | 3/2013 | Rath et al. | |
| 2016/0097663 A1 | 4/2016 | Kim et al. | |

FOREIGN PATENT DOCUMENTS

| | | |
|---|---|---|
| CN | 107121168 A | 9/2017 |
| CN | 206990019 U | 2/2018 |

* cited by examiner

COMPACT ULTRASONIC FLOWMETER WITH ADJUSTMENT FOR VARIOUS FLOW DIAMETERS

RELATED APPLICATIONS

This application is a continuation-in-part of, and claims priority to, PCT Application Serial No. PCT/CN2017/087199, filed Jun. 5, 2017, and claims priority to Chinese Application Serial Nos. 201710414529.1 and 201720642885.4, both also filed Jun. 5, 2017, which applications are incorporated herein by reference, in their entireties.

FIELD

This application relates to the field of ultrasonic fluid flow rate measurement, in particular to ultrasonic flow meters including adjustable-angle transducers.

BACKGROUND

FIG. 1 is a schematic diagram of an external clamp-on type ultrasonic flow meter for measuring fluid flow within pipes. The ultrasonic flow meter 2 comprises two ultrasonic transducers, an upstream ultrasonic transducer 4 and a downstream ultrasonic transducer 6 wherein each ultrasonic transducer is provided with a piezoelectric chip 8 for transmitting and receiving ultrasonic signals across a pipe 10. The transducer 6 may also be referred to herein as an ultrasonic transceiver. The principle of time-difference ultrasonic measurement is used in which ultrasonic propagation in the downstream direction demonstrates acoustic velocity increase, and in the counter current direction it is reduced. This relationship is described by the following equation:

$$V = \frac{(M+1) * D}{\sin 2\theta} \times \frac{\Delta T}{T_{up} * T_{down}}$$

wherein V is average flow velocity over the acoustic path, M is ultrasonic signal reflection time, D is pipe inner diameter, θ is the angle between signal and flow, $T_{up}$ is the signal transmit time from downstream to upstream, $T_{down}$ is the signal transmit time from upstream to downstream, and $\Delta T = T_{up} - T_{down}$. When ΔT has a negative value, the fluid flow rate is in the reverse direction, giving the time-difference ultrasonic flow meter utility in bi-directional flow applications.

In addition, the flow velocity of a fluid is different at the different positions of the pipe. The flow velocity in the center of the pipe is faster than that near the tube wall. The velocity distribution of a fluid in a pipe can be represented by a velocity profile. By setting up the flow meter and taking into account the influence of the velocity distribution, the average flow velocity over the cross-sectional area of the pipe can be calculated, and the volume flow rate of the fluid can be obtained according to the cross-sectional area of the pipeline. The calculation formula of volume flow rate (Q) is:

$$Q = V_{ave} \times A$$

wherein V is average velocity as above, and A is cross-sectional area. Mass flow rate (M) is calculated:

$$M = \rho \times Q$$

wherein ρ is fluid density.

Adapting these principles while accounting for the effect of the pipe on flow rate measurement with given distances s, d, $S_1$ and $S_2$ and angles $\theta_1$, $\theta_2$, $\theta_3$ as understood by those with routine skill in the art, FIG. 2 illustrates the so-called "V-type" for ultrasonic flow meter 12 installation. As shown in FIG. 2, 'L1' refers to pipe wall thickness for a pipe of uniform wall thickness. 'L2' refers to pipe diameter of a constant-diameter pipe section where the flow meter is installed. 'θ1' is the angle of ultrasonic emission relative to the pipe surface normal where the emitted waves impinge on the pipe (the "surface normal"). 'θ2' is the angle of transmission of the ultrasonic beam through the pipe wall relative to the surface normal, which can differ from 'θ1' due to refraction. 'θ3' is the angle of transmission of the beam through the fluid flowing in the pipe relative to the surface normal. 'd' is the distance between the ultrasonic transceivers 6 and 's' is the distance between the point of entry and exit of the ultrasonic beam. 'S1' is given by 'L1' times the tangent of 'θ2' and 'S2' is given by 'L2' times the tangent of 'θ3'.

Chinese Patent No. 203848888 describes an ultrasonic flow meter adapted to fit different pipe diameters that uses transceivers mounted with housing sections that are adjustable through a range of angles at discrete intervals. To achieve proper angular orientation of the acoustic beams, the distance between the angled transceivers must also be adjusted in many instances because of the gross nature of the angular adjustment. While this complication is touted as a feature allowing for smaller distance achieved between the transducers when used with smaller pipes, the need for lateral sensor adjustment introduces complexity to system setup. Accordingly, a need persists for an improved method for ultrasonic flow measurement that can be adjusted in the field for different pipe sizes, and an improved flow measurement apparatus capable of performing the new method.

SUMMARY

Embodiments herein provide for ultrasonic flow meters comprising rotating transducer bodies (alternatively referred to as blocks), each incorporating, having or including a piezoelectric transducer wafer or chip used for transmitting and/or receiving ultrasonic signals. The rotatable blocks are rotatable in fine increments. These steps or increments are ideally less than 1 degree and may be as fine as about 1/100 of a degree or smaller.

Associated gears (or other linking means) enable precise and coordinated angular orientation of the transducer bodies or blocks. As such, angular position can be achieved such that no lateral adjustment of sensor position is necessary in order to achieve transducer signal pickup for any pipe within a given size range. As such, the added system capability for fine, coordinated angular transducer or transceiver adjustment reduces overall system setup complexity.

Moreover, the subject approach eliminates any associated drawbacks associated with having to change the lateral spacing of the sensors involved. One such drawback is the likelihood of setup error and resulting data-collection and/or accuracy errors. The need to engage in a frustrating trial-and-error setup procedure is also avoided. Notably, any of these problems represent a significant reason for consumers to avoid purchasing such a product—especially homeowners looking for a simple solution.

The transducers or transceivers of the ultrasonic flow meter may also be associated with a rotary marker for indicating the position of rotating blocks holding the ultrasonic transducers. The rotary indicator may be provided in connection with an angle identification plate, an angle display or a signal indicator light emitting diode (LED) display.

Embodiments may also include a drive and counter-rotation mechanism, that is connected with the rotating blocks and may actuate their motion during setup. The driving mechanism may be an electric motor. Automation, for example via a programmed microprocessor of the angular adjustment system may be provided in connection with the counter-rotation mechanism.

As referenced above, the counter-rotation mechanism may be, or may include a gear mechanism, for example a worm gear mechanism. Alternatively, a crank or linkage mechanism may be used, or a belt and pulley mechanism. Various mechanical configurations can be employed to enable rotation of the first and second transducer bodies or blocks in opposite but equal directions. A counter-rotation mechanism causes the transducers to rotate in opposite directions, but with same absolute angular value or with any other corresponding values that effectively adjust the relative orientations of the piezoelectric wafers so that the ultrasonic transmission path is useful for flow measurement.

During setup adjustment, a programmed computer processor may be employed to control the rotating blocks. The same processor may also be programmed to calculate flow rate values and other measurements based on the time difference between first and second transducer signal receipt.

The flow meter may also include a memory for storing the relationship between different pipeline diameters and the angle of the piezoelectric wafer(s). In which case, the flow meter can determine piezoelectric wafer angle based on the relationship table of pipe diameter required and adjust setup automatically, setting the rotation angle as needed. The flow meter may also comprise a pipe diameter measuring tool or module, with the diameter measurement module connected with the processor to effect adjustment per above.

In addition, the flow meter may also include a communication module connected with the processor for transmitting measured flow rate. Such communication may be received by a smart phone, or otherwise be made available for remote access on the world wide web. The ultrasonic flow meter may also include a display for displaying the calculated flow value locally. Still further, a system incorporating the flow meter may include a printing device to be connected with the flow meter processor.

The subject devices as well as methods of their preparation or installation and/or use as disclosed and as may be further understood by those with skill in the art upon review of this filing are included as inventive aspects or embodiments. In sum, the subject device or systems, kits in which they are included (with or without assembly), methods of use and manufacture (including pre-assembly and/or on-site installation) are all included within the scope of the present disclosure.

BRIEF DESCRIPTION OF THE DRAWINGS

The details of the subject matter set forth herein, both as to its structure and operation, may be apparent by study of the accompanying figures, in which like reference numerals may refer to like parts. The components in the figures are not necessarily to scale, emphasis instead being placed upon illustrating the principles of the subject matter. The illustrations are intended to convey concepts, where relative sizes, shapes and other detailed attributes may either be illustrated schematically rather or precisely. To-scale features (e.g., as from engineering drawings and/or photographs) may be relied upon as antecedent basis for claim support.

DETAILED DESCRIPTION

Embodiments hereof provide for an ultrasonic flow meter that is capable of adjusting the angle of included piezoelectric wafer transducers. The flow meter is configured for externally clamping onto pipes of different diameters. In addition, it is configured for V-type use as referenced above.

Figure 2:
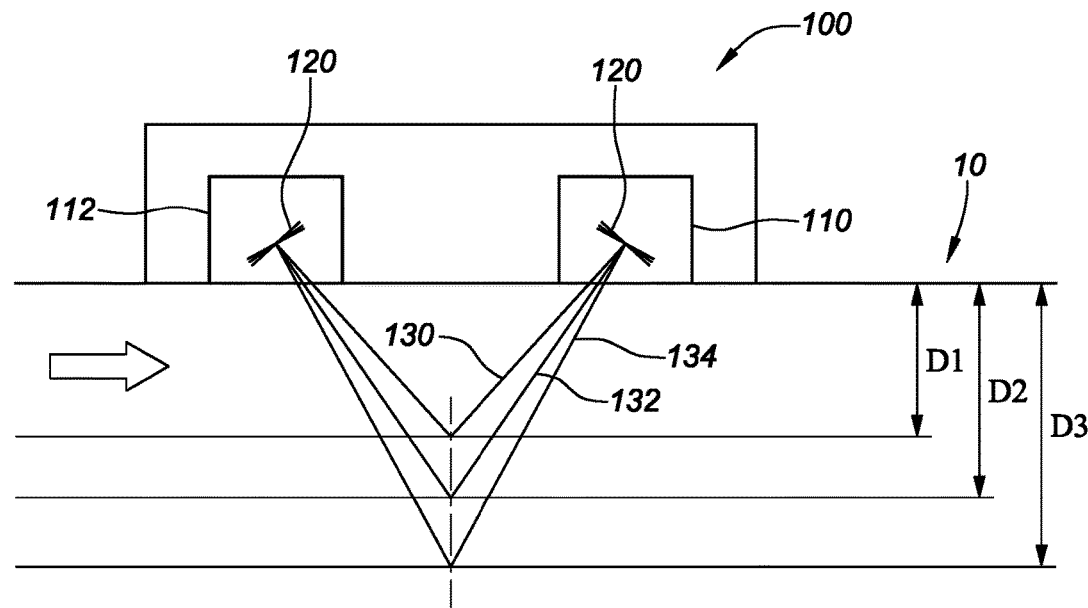
FIG. 2 is a diagram illustrating the ultrasonic flow meter approach hereof

Referring to FIG. 2, a flow meter 100 includes two ultrasonic transducers, a first ultrasonic transducer 110 and a second ultrasonic transducer 112. The first ultrasonic transducer 110 may be disposed upstream on the pipe 10 with the second ultrasonic transducer 112 disposed on the pipe downstream of the first transducer 110.

In use, the first ultrasonic transducer 110 using a piezoelectric wafer or chip included therein transmits ultrasonic signals and the second ultrasonic transducer 112 using its included piezo-chip) receives an ultrasonic signal from the first transducer 110. Then the second transducer 112 transmits ultrasonic signals, and the first transducer 110 receives an ultrasonic signal from the second transducer 112. A processor coupled to the first and second transducers may then calculate pipe flow rate and other measurements as discussed in the Background section above, for example, as understood in connection with known V-type flow meter systems or otherwise.

Figure 1A:
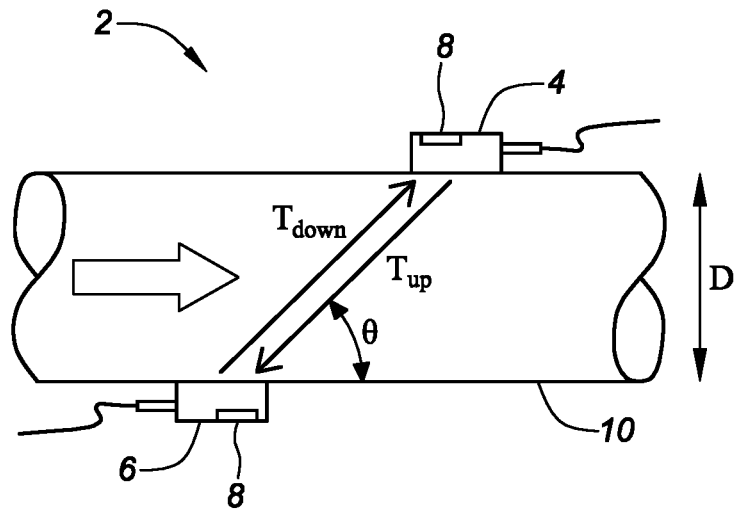
FIGS. 1A and 1B are diagrams illustrating known ultrasonic flow meter configurations and principles.
Figure 1B:
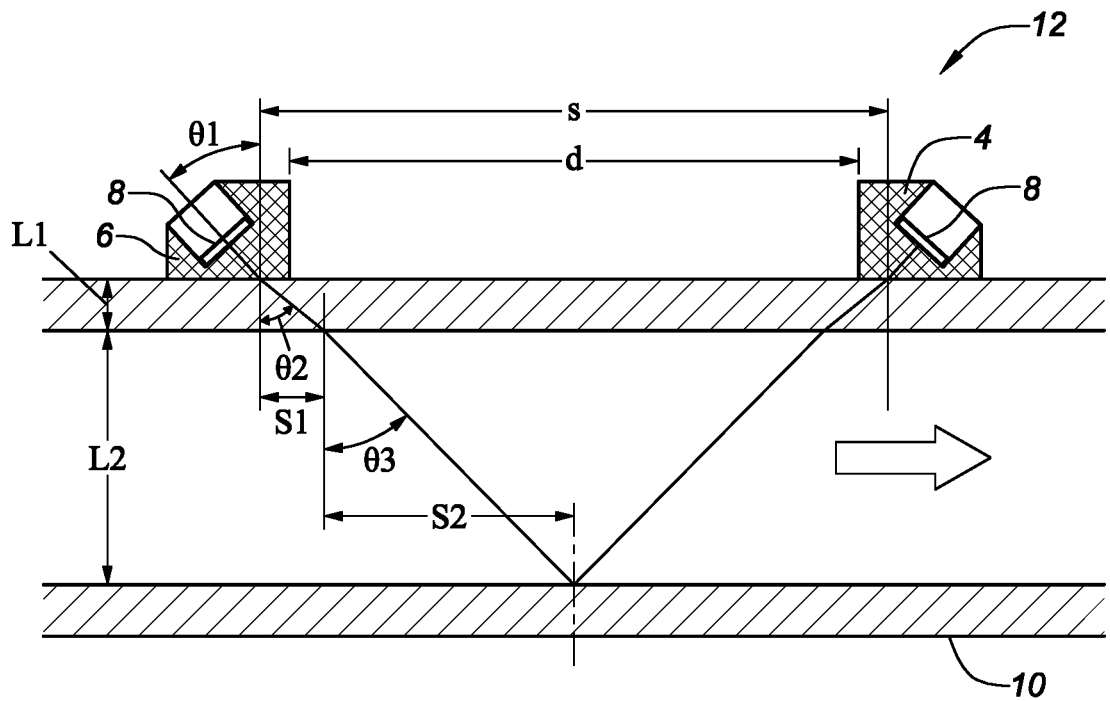

As further illustrated in FIG. 2, by rotation of the angle of the transducers 110, 112 each including a piezoelectric wafer 120, the reflected "V" paths 130, 132, 134 can be altered to achieve proper send-and-receive signals for different diameter pipes with an internal diameter D1, D2 and/or D3 corresponding to L2 in FIG. 1. Critically, no lateral adjustment is required between the transducers in order to support proper function in connection with different diameter pipes. Pipe diameters may range, for example, from about ¼ (0.25) inch to about 12 inch, typically 3 inch to 8 inch for industrial applications and about ½ (0.5) inch to about 2 inch or to about 4 inch for home or consumer applications. While the transducers 110, 112 are shown equidistant from the point of the "V" paths 130, 132, 134 where the ultrasonic beam reflects from the opposite interior wall of the pipe, one of ordinary skill may adapt the methods and apparatus disclosed herein to achieve similar results for an apparatus in which transducers are not equidistant from the reflection point.

Figure 3:
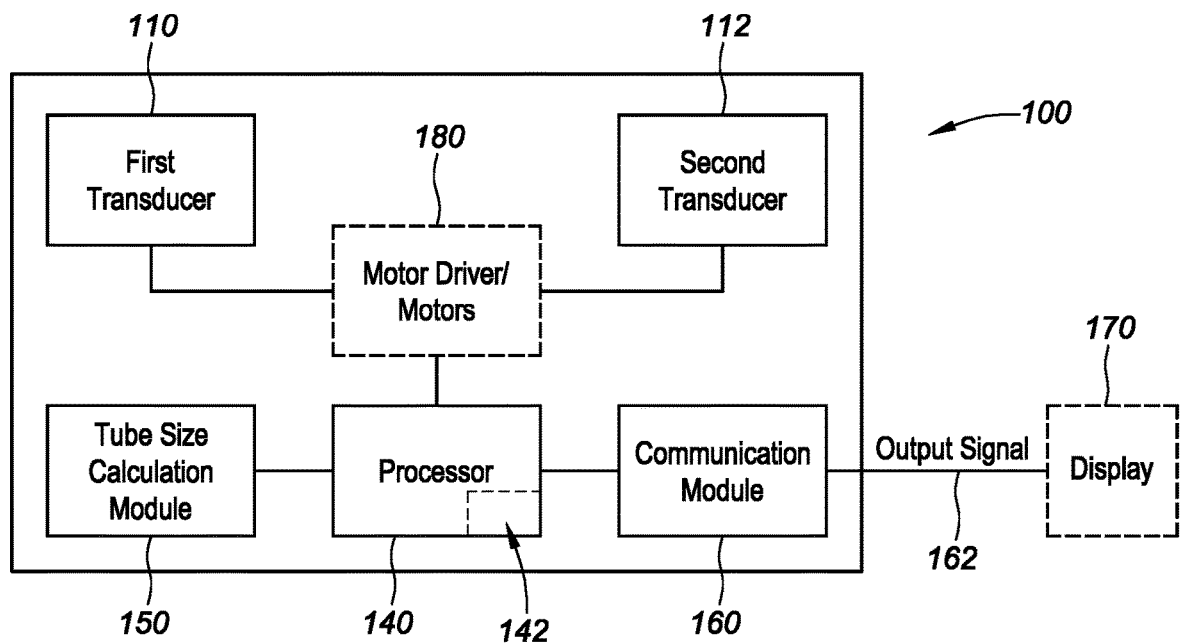
FIG. 3 is a schematic diagram showing the working modules of the subject flow meter.

FIG. 3 is a schematic diagram of the working modules included in the subject flow meter 100. These include transducers 110 and 112 and a computer processor 140, which may be configured as described further below. The processor is shown operatively connected to the transducers for piezoelectric wafer signal acquisition as well as angular position control. The processor may also be in communication with each of a tube or pipe size measurement or calculation module 150 and a communication module 160.

Computer processor or processing unit 140 may include a memory 142 for storing relationships between the different pipe diameters (e.g., outside diameter) and the angle of the piezoelectric wafers for proper operation. In automatically setting (or suggesting a set angle for manual adjustment) such information is used by the computer processor along with any additional parameters (such as pipe material or type, pipe wall thickness and/or fluid properties) also saved in memory. When other conditions remain unchanged while the thickness of the pipe, the pipe material, or the fluid in the pipeline changes, a relation table of different thickness, different materials and/or different fluids and the piezoelectric wafer angle can be employed to properly setup transducer angle and/or calculate flow rate within the pipe. In one example, after selecting a known pipe type (and/or outer diameter) pipe thickness can be provided via a look-up table in which the correlation is assumed based on industry standards or data.

In any case, pipe size module 150 is may be used control sensor angle during initial setup on a pipe of known diameter or when moving the flow meter from a pipe of one diameter to another. The module 150 may use an ultrasonic distance sensor, a laser sensor, an infrared sensor, electro-mechanical calipers or a variable resistance range sensor to take readings for distance or diameter calculation. Operation of the pipe size module 150 within the subject system may be as further described below with reference to FIG. 4.

Communication module 160 may be used to transmit flow rate and other values calculated using the processor and/or other information as a wireless or a wire output signal 162. The latter may employ an RS485 interface, and the former be based on WiFi, Bluetooth or another transmission protocol.

Output signal 162 may be displayed locally on a monitor, a liquid crystal display (LCD), light emitting diode (LED) screen or readout 170, received for display by a so-called "smart phone" or otherwise communicated to a user and/or monitoring system. Likewise, the communication module may be connected with a computer processor for transmission of the ultrasonic flow meter measured flow rate.

Figure 7:
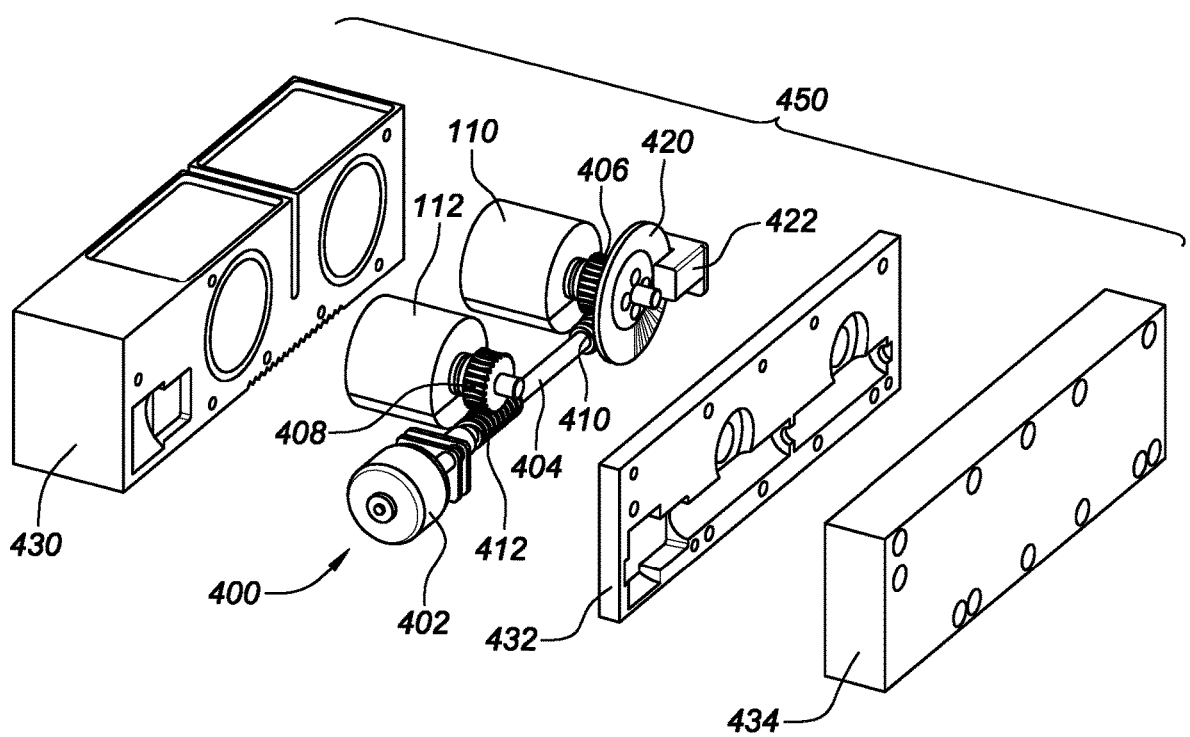
FIG. 7 is an assembly view of active components within the subject flow meter.

The processor 140 may also be coupled to a motor driver 180 used for driving an electric motor and/or to one or more motors, for example, a stepper motor or a brushless DC servomotor coupled to a counter-rotation mechanism via a drivetrain, for example, a drive shaft (e.g., as in FIG. 7). In some embodiments, the counter-rotation mechanism comprises two motors, wherein each motor rotates one of the pair of transducers and is operably coupled to a computer processor for motion control. Further examples of counter-rotation mechanisms are described later in the specification. A motor driver is an electronic component that receives a control signal from the processor 140 and provides electrical power to one or more motors according to the control signal. Some motors may come packaged with integral drivers.

Figure 4:
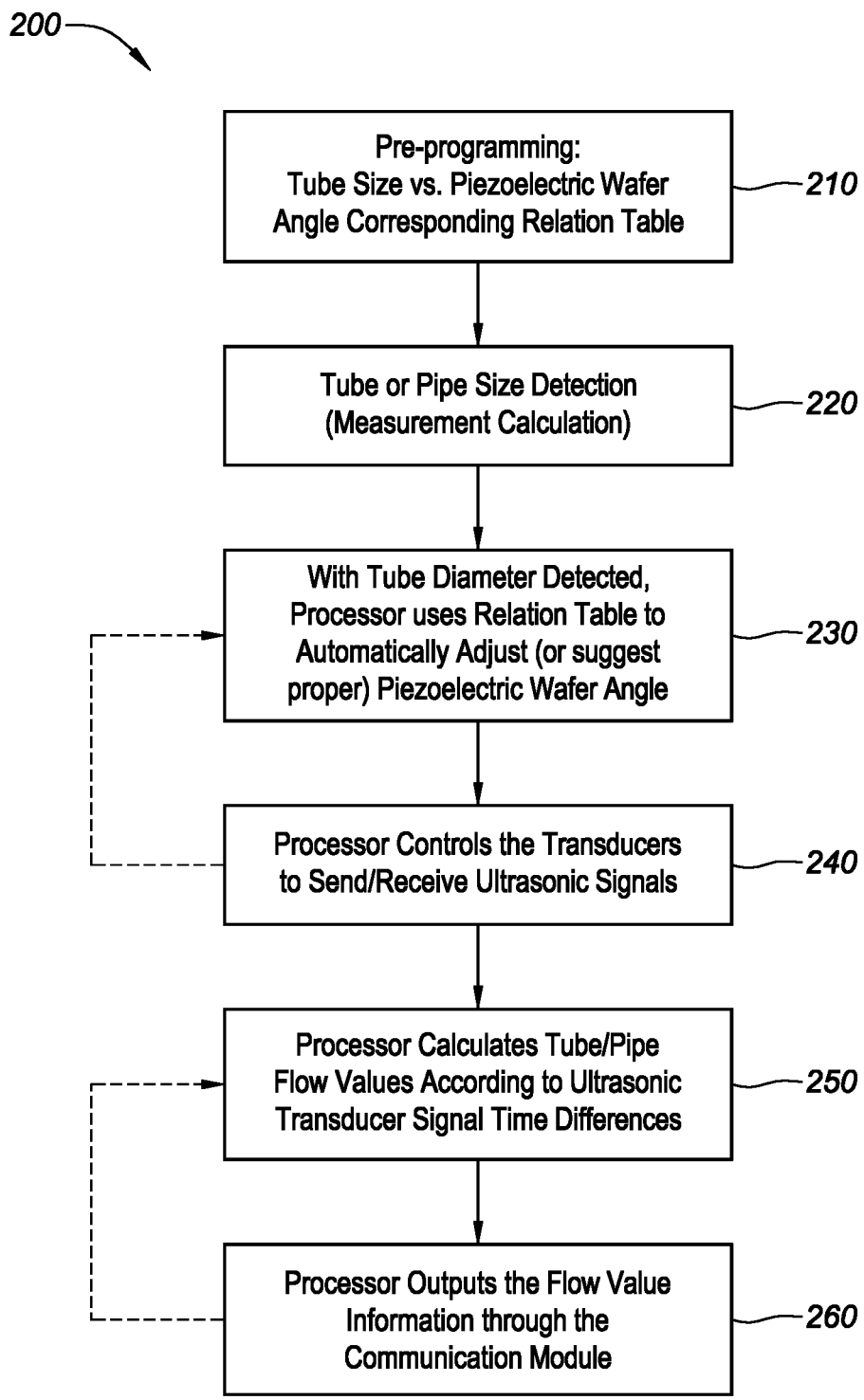
FIG. 4 is a flowchart detailing flow meter setup and use.

Referring to FIG. 4, a method 200 for configuring and operating a flowmeter may include operations for pre-programming and system setup. At 210, the computer processor 140 accesses a table in memory 142, the table including preprogrammed values relating pipe diameter to desired piezoelectric wafer angle. This information may be regarded as a sort of corresponding relation table. At 220, the processor 140 obtains a measurement value for the pipe diameter from the measurement module 150. For example, the processor may receive a signal from a measurement module that indicates a measured diameter of a pipe to which the flowmeter is installed. The processor may look up a value for the inner diameter in a data table, estimate the inner diameter as a function of the outer diameter, or if suitably equipped may detect or measure the inner diameter. At 230, the processor 140 calculates a rotation needed to rotate the transducers 110, 112 to an intended angle, for example by selecting from values available from the reference table based on the measurement value obtained, and generates a control signal for the calculated rotation to a motor driver for a counter-rotation mechanism. At 240, the processor causes each of the transducers to send and attempt receipt of signals via their included piezoelectric wafers 120. If any error in receipt is registered, the angles may be adjusted as indicated by the dashed line returning to step 230 within a range of angles, followed by another check 240. With proper signal capture at 240, the processor calculates flow rate value of the fluid in the pipe in accordance with time differences observed for the signals in step 250. At 260, the processor outputs the flow rate value information through communication module 160.

The operations 250 and 260 may be run repeatedly (also indicated by dashed line) at 5 minute intervals or another selected time interval. In such fashion, fluid flow rate monitoring may be achieved with system 100 that is continual, instantaneous (e.g., with respect to spikes in fluid usage), averaged over a time period, and totalized over a period of time to provide the total volume of fluid usage for monetary conservation or other purposes. Alerts may be programmed to accompany the processor output 260 in the event of over usage, under-usage and/or unexpected changes in flow that might signal a pipe leak or break due to aging, freezing or another event.

Figure 5A:
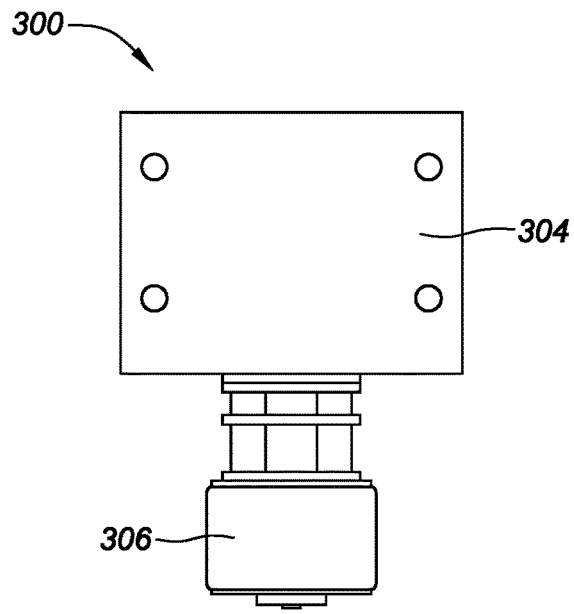
FIGS. 5A and 5B are engineering drawings detailing system components.
Figure 5B:
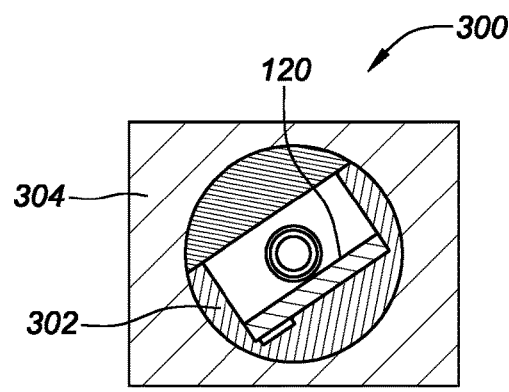

FIGS. 5A and 5B illustrate specific, optional hardware details of the subject embodiments. An ultrasonic transducer probe 300 of an ultrasonic flow meter is shown. It comprises a rotating transducer body or block 302 and a fixed housing, frame or block 304. Block 302 is provided with a piezoelectric wafer 120 for transmitting or receiving ultrasonic signal(s). Block 302 is rotatably received in the fixed frame 304 and optionally driven to different angular orientation by a motor 306 automatically via software and computer processor or controller implementation to adjust the angle of the piezoelectric wafer 120 as discussed above.

Two transducer probes so configured can be provided in a system 100, in which they are electronically linked, e.g., as described in connection with FIG. 3, so that they will rotate in equal and opposite directions upon command. More specifically, each rotating block may be rotated directly as shown or indirectly via intervening transmission components separately with its own stepper motor or electric gear motor with any suitable angular sensing means.

In any case, each fixed frame 304 may be integrated into a single housing. Otherwise, each probe subassembly 300 can be secured to an exterior housing or shell, e.g., as pictured in FIG. 8.

Coupling compound (e.g., silica gel) may fill space between the frame 304 and the rotating block 302. The rotary or rotating block and frame may be made of Polymethyl methacrylate (PMMA), Polyetherimide (PEI) polyether or Polyvinyl chloride (PVC). Other options are possible as well. Ceramic piezoelectric wafers with a frequency of 2 MHz can be mounted on the rotating block. Other options are possible as well. The construction options noted above may be applied to any of the subject embodiments, for example, as pictured in FIGS. 7 and 8, or other embodiments covered by the claims herein.

In some embodiments, the transducer of the ultrasonic flow meter may also include a rotary marker that indicates the position of the rotating block by the marker, e.g., as in an angle pointer. The angle pointer or indicator or other angular display device may be used as a rotary marker. When an angle identification plate is used, the rotating block can be rotated by hand, and the rotation angle of the rotating block can be marked according to a scale associated with the angle identification plate. Such action may be linked between first and second angle blocks, coordinating the manual input.

Figure 6A:
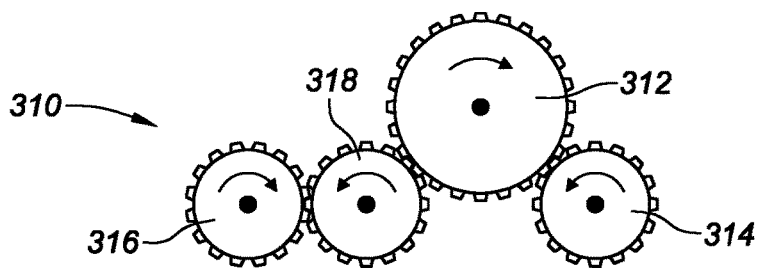
FIGS. 6A-6C are schematic drawings of alternative transceiver linking means.
Figure 6B:
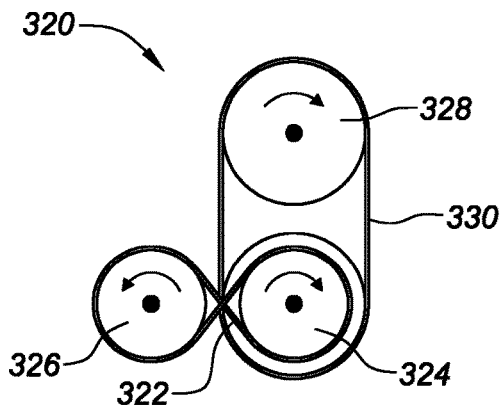
Figure 6C:
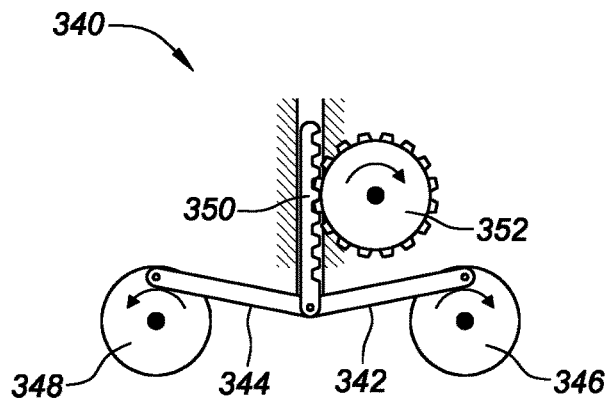

The ultrasonic flow meter may include a counter-rotation mechanism linked to each transducer, configured to rotate each member of the pair a corresponding amount in opposite directions, thereby enabling adjustment of an acoustic path between the piezoelectric wafer of each transducer in the pair and an opposite internal wall of a pipe for a range of pipe diameters without lateral adjustment between the transducer bodies. The counter-rotation mechanism may include any of a selection of gears, linkages and/or belt-pulley arrangements. Examples of suitable counter-rotation mechanisms are shown in FIGS. 6A-6C. In FIG. 6A, a spur gear system 310 is provided in which input to a drive gear 312 causes rotation at rotating block gears 314, 316 with idler gear 318 reversing the direction of gear 316 relative to gear 314. In FIG. 6B, a belt (or chain) drive system 320 includes a belt or chain 322 deployed in a Mobius or figure-8 loop with rotating block pulleys or sprockets 324, 326 along with an optional input or drive pulley or sprocket 328 and belt or chain 330. In FIG. 6C, a linkage system 340 includes links or rods 342, 344 that are rotatably attached to rotating blocks 346 and 348, respectively. The links are driven by rack 350 and pinion 352 assembly. The drive or input gear (or pinion) in these various embodiments may serve as a so-called "thumbwheel" actuator for manual user input, or the assemblies may be driven automatically e.g., as with a motor through an input shaft.

In some embodiments, means may be included to indicate proper angular alignment of the transducers. For example, an LED light may be configured to display whether the ultrasonic signals are being received or not. As another example, an assembly or array of LED lights of one or more color may be configured to indicate signal quality, or a variable brightness of a lamp may be used to show the strength of the ultrasonic signal received by the measurement transducers such as the piezoelectric wafers or chips 120. Other options are possible as well.

As shown in FIG. 7, transducer portions 110, 112 incorporating piezoelectric wafers 120 of an ultrasonic flow meter may be coupled to and driven by a transmission mechanism 400. In the illustrated embodiment, a motor 402 (e.g., a stepper motor) is connected to a worm gear drive shaft 404 and worm gears 406, 408. By applying opposite direction (e.g., left handed and right handed) worm thread sections 410, 412 on the worm gear drive shaft 404 that mesh with worm gears 406 and 408, respectively, counter rotation of the transducers is achieved when using the transmission mechanism. The precise orientation of the transducers and/or tracking of transducer rotation can be sensed using optical wheel 420 and associated optical sensor and encoder 422 as shown.

Advantages of the worm screw and worm gear approach include less backlash and greater ease by which a stepper motor and software control can be implemented for automatic adjustment. One or more of the embodiments in FIGS. 6A-6C may be better suited for manual adjustment approaches.

In any case, FIG. 7 also illustrates a stationary block or frame 430 in which the transducers are rotatably received. An intermediate block or frame 432 provides clearance for motor 402 as does block/frame 430. In addition, the intermediate frame provides shaft bearing surfaces aligned with the transducers and associated worm gears. Finally, FIG. 7 illustrates a cap or sealing block or housing 434 with which the entire assembly 100 is closed. The sub-assembly 450 provides a transducer housing assembly that may be located within an exterior housing as shown in the cross section view of FIG. 8.

Figure 8:
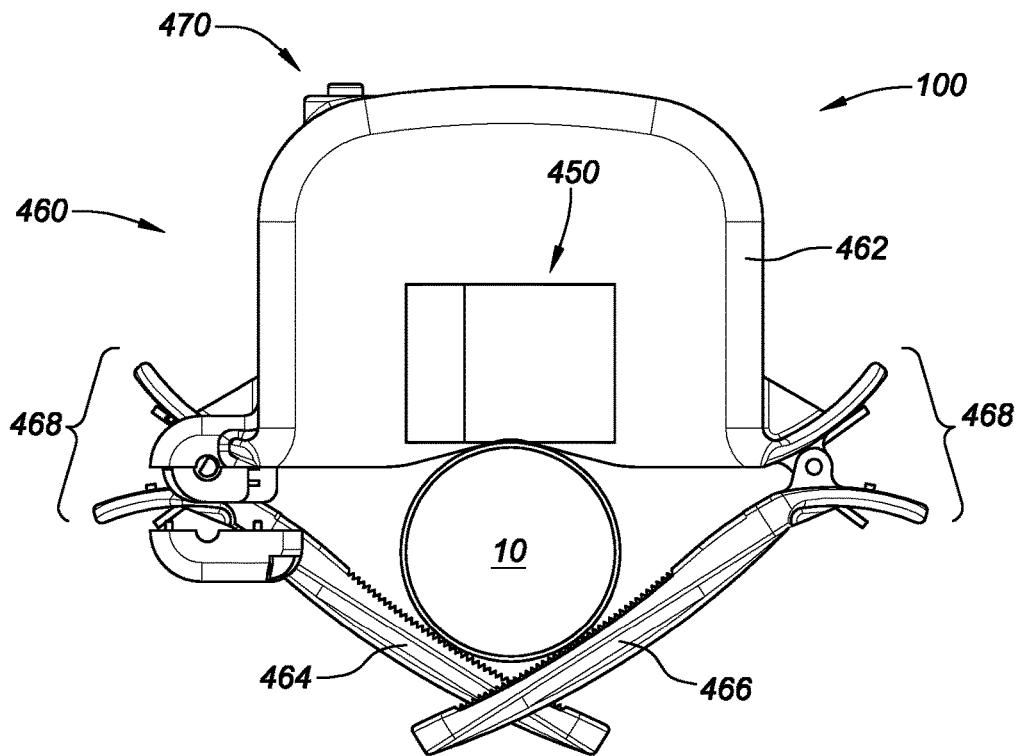
FIG. 8 is a side cross-section view drawing illustrating flow meter installation over a pipe.

As shown in FIG. 8, a complete flow meter 100 including subassembly 450 may include an exterior housing 460 made up of a shell 462 and flaps 464, 466. The flaps are spring loaded to exert pressure on a pipe 10 located between the shell and the flaps and thereby hold the ultrasonic flow meter stable in place during flow measurement of fluid flowing through the pipe 10. Wing-type ends 468 can provide a user interface for pinching the flaps open for pipe receipt. As shown, flaps 464 and 464 are interleaved like crossed or clasped fingers. Each flap may include two (or more) finger-like extension portions. Various buttons and or knobs 470 for user control may extend through the housing 460. Although not shown, various displays and/or other indicator light features may also be incorporated in the flow meter 100.

For initially setting-up the system or changing between pipes, the distance between the first transducer 110 and second transducer 112 is fixed. Instead of changing the distance between the transducers to compensate for pipes of different diameter, the processor or user may compensate for variation in pipe diameter by rotating the included piezoelectric wafers such that appropriate signal send-and-receive between the wafers is achieved. This may be performed by the processor of the flowmeter 100 automatically, after a user positions the flow meter housing shell 460 and flaps 462, 464 around a pipe as pictured in FIG. 8 and presses one or more of the buttons 470 or other user interface. Or, as stated before, the angular setup of the transducers and included piezoelectric wafers may be accomplished manually using a single manual input translating motion to equal and opposite rotation via the included linking means or mechanism.

Computer Hardware

Embodiments hereof provide a pipeline flow measuring system, which uses the ultrasonic flow meter of the invention to measure the fluid flow rate in the pipeline and can monitor in real time. The monitoring device can be a PC, a mobile phone or a tablet device.

In some embodiments, the ultrasonic flow meter may also include a display for displaying fluid flow rate in a pipe or for displaying other information values, such as temperature, time, etc. Likewise, some embodiments include a processor, memory and communication module to achieve automatic control, adaptive processing, and enable a better user experience with simple device or system setup or settings.

The calculation or processes carried out in connection with the embodiments herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, USBC, Display Port, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein. The camera may be a digital camera of any type including those using CMOS, CCD or other digital image capture technology.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, an optical disc, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be encoded as instructions and data in a non-transitory computer-readable medium, for example, a computer memory. When executed by a processor, the encoded instructions may cause an apparatus, for example a flow sensor, to perform a method as described herein. Computer-readable media includes both computer storage media and communication media including any medium that facilitates transfer of a computer program from one place to another. A non-transitory computer-readable medium may include any non-transitory medium suitable for access and decoding by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to encode desired program code in the form of non-transitory instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Operations as described herein can be carried out on or over a website. The website can be operated on a server computer or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Variations

The subject methods, including methods of use and/or manufacture, may be carried out in any order of the events which is logically possible, as well as any recited order of events. Furthermore, where a range of values is provided, it is understood that every intervening value, between the upper and lower limit of that range and any other stated or intervening value in the stated range is encompassed within the invention. Also, it is contemplated that any optional feature of the inventive variations described may be set forth and claimed independently, or in combination with any one or more of the features described herein.

Though the invention has been described in reference to several examples, optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention.

Reference to a singular item includes the possibility that there is a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as the claims below. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in the claims shall allow for the inclusion of any additional element—irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity. Accordingly, the breadth of the different inventive embodiments or aspects described herein is not to be limited to the examples provided and/or the subject specification, but rather only by the scope of the issued claim language.

The invention claimed is:

1. An ultrasonic flow meter comprising:
   a pair of transducers comprising a first transducer body and a second transducer body each including a piezoelectric wafer;
   a frame supporting the pair of transducers in rotatable relation to one another; and
   a counter-rotation mechanism linked to the pair of transducers and configured to rotate each member of the pair a corresponding amount in opposite directions, enabling adjustment of an acoustic path between the piezoelectric wafer of each transducer in the pair and an opposite internal wall of a pipe for a range of pipe diameters without lateral adjustment between the transducer bodies.

2. The flow meter of claim 1, wherein the counter-rotation mechanism comprises gears.

3. The flow meter of claim 2, wherein the gears are worm gear components.

4. The flow meter of claim 3, wherein each transducer body rotates with a worm gear and opposite-handed sections of a worm drive shaft meshes with each worm gear.

5. The flow meter of claim 1, further comprising at least one motor for driving the counter-rotation mechanism.

6. The flow meter of claim 5, wherein the at least one motor is a stepper motor.

7. The flow meter of any of claim 1, wherein the counter-rotation mechanism comprises two motors, wherein each motor rotates one of the pair of transducers and is operably coupled to a computer processor for motion control.

8. The flow meter of claim 1, further comprising a rotary angle indicator showing rotational position of the pair of transducers.

9. The flow meter of claim 8, wherein the rotary angle indicator is selected from a group consisting of an angle identification plate, an angle display and a light emitting diode (LED) display.

10. The flow meter of claim 1, further comprising a processor operably coupled to the counter-rotation mechanism for controlling rotation of the pair of transducers.

11. The flow meter of claim 10, wherein the processor is also connected to control operation of the pair of transducers including emission and detection of ultrasonic signals.

12. The flow meter of claim 10, wherein the processor is programmed with instructions that when executed calculate a pipe flow rate based on piezoelectric signal time differences.

13. The flow meter of claim 12, further comprising a memory storing a relationship between different pipeline diameters and the angle of the transducer bodies for setup.

14. The flow meter of claim 12, further comprising a pipe diameter measuring module coupled to the processor.

15. The flow meter of claim 12, further comprising a communication module coupled to the processor for transmitting a flow rate calculated by the processor to an output device.

16. The flow meter of claim 1, wherein the frame and counter-rotation mechanism are configured for use with a range of pipe diameters between about 0.25 and about 12 inches.

17. The flow meter of claim 16, wherein the frame and counter-rotation mechanism are configured for use with a range of pipe diameters between about 0.5 to about 4 inches.

18. The flow meter of claim 16, wherein the frame and counter-rotation mechanism are configured for use with a range of pipe diameters between about 3 to about 8 inches.

19. A method of flow meter use comprising:
   installing a pair of transducers to the pipe linked via a counter-rotation mechanism;
   determining a diameter of a pipe carrying a flow to be measured;
   adjusting the counter-rotation mechanism based on the diameter; and
   measuring a total flow rate in the pipe at least in part by sensing the transmission time of an ultrasonic signal passed between the pair of transducers through the flow and calculating a total flow rate based on the transmission time and an angular position of the counter-rotation mechanism during the sensing.

20. The method of claim 19, wherein the determining further comprises automatically determining the diameter including detecting an outer pipe diameter, looking up an inner pipe diameter using a data table, and adjusting the counter-rotation mechanism accordingly.

* * * * *